(12) United States Patent
Park

(10) Patent No.: US 9,826,775 B2
(45) Date of Patent: Nov. 28, 2017

(54) FOOD FORMING AND SHAPING DEVICE

(71) Applicant: Brian B. Park, Los Angeles, CA (US)

(72) Inventor: Brian B. Park, Los Angeles, CA (US)

( * ) Notice: Subject to any disclaimer, the term of this patent is extended or adjusted under 35 U.S.C. 154(b) by 479 days.

(21) Appl. No.: 14/592,129

(22) Filed: Jan. 8, 2015

(65) Prior Publication Data

US 2016/0198757 A1    Jul. 14, 2016

(51) Int. Cl.
*A23P 30/10* (2016.01)
*A23P 10/28* (2016.01)

(52) U.S. Cl.
CPC ............... *A23P 30/10* (2016.08); *A23P 10/28* (2016.08)

(58) Field of Classification Search
CPC ...................................................... A23P 10/28
See application file for complete search history.

(56) References Cited

U.S. PATENT DOCUMENTS

| | | |
|---|---|---|
| 873,396 A | 12/1907 | Walters |
| 3,138,120 A | 6/1964 | Balmer |
| 4,741,264 A | 5/1988 | McPeak |
| 5,012,726 A | 5/1991 | Fehr |
| 5,037,350 A | 8/1991 | Richardson |

(Continued)

FOREIGN PATENT DOCUMENTS

| | | |
|---|---|---|
| CA | 2287027 C | 5/2002 |
| CN | 203331105 U | 12/2013 |

(Continued)

OTHER PUBLICATIONS

I Upload, Hope You Learn Loads, Making Candy Canes, Jul. 22, 2008, YouTube. https://www.youtube.com/watch?v=pnHKFvflgFQ.

(Continued)

*Primary Examiner* — Ryan Ochylski
(74) *Attorney, Agent, or Firm* — Kevin Schraven; Anooj Patel; Hankin Patent Law, APC

(57) ABSTRACT

A food forming and shaping device. The food forming and shaping device may comprise: a mixer, forming and shaping portion, and cutter. The mixer may comprise: at binder container, a cereal base container, and a hopper. The binder container may store and dispense a binder to the hopper. The cereal base container may store and dispense a cereal base to the hopper. The hopper may mix the cereal base and the binder to create the food mixture. The hopper may pour the food mixture onto a mixing surface of the frame. The forming and shaping portion may comprise: a frame; rollers, motors, pistons, and top mixing surface. The rollers may be rotatably connected to the frame and may be adjacent to one another. The motors may actuate the rollers, such that the motors may actuate the feed roll heads in the same direction. When the food mixture is placed onto the top mixing surface, the shoulder plate may move the food mixture to the rollers. The rollers may roll and press the food mixture to create a formed and shaped food mixture. The pistons may be connected to the frame and may shift one or more rollers to create various densities for the food mixture. The conveyor belt may move the formed and shaped food mixture to the cutter of the food forming and shaping device. The cutter may comprise one or more cutting instruments for slicing the formed and shaped food mixture to create one or more food bar portions.

14 Claims, 5 Drawing Sheets

(56) References Cited

U.S. PATENT DOCUMENTS

| | | | |
|---|---|---|---|
| 5,129,805 | A | 7/1992 | Vrouwenvelder |
| 5,455,053 | A | 10/1995 | Zimmermann |
| 5,799,567 | A | 9/1998 | Dorner |
| 5,809,872 | A | 9/1998 | Sundquist |
| 6,103,283 | A | 8/2000 | Zukerman |
| 6,291,008 | B1 | 9/2001 | Robie |
| 6,375,998 | B1 | 4/2002 | Wu |
| 6,609,821 | B2 | 8/2003 | Wulf |
| 6,878,390 | B2 | 4/2005 | Murray |
| 7,169,422 | B2 | 1/2007 | Mesu |
| 7,431,955 | B2 | 10/2008 | Froseth et al. |
| 8,110,231 | B2 | 2/2012 | Coleman et al. |
| 8,257,773 | B2 | 9/2012 | Froseth |
| 2008/0230351 | A1* | 9/2008 | Taylor .................. A22C 7/0038 198/467.1 |
| 2010/0092633 | A1* | 4/2010 | Teeuwen .................. A23G 1/26 426/389 |
| 2010/0129485 | A1* | 5/2010 | Uchida .................. B30B 11/16 425/408 |
| 2014/0154363 | A1 | 6/2014 | Duffy et al. |

FOREIGN PATENT DOCUMENTS

| | | |
|---|---|---|
| DE | 10325526 A1 | 12/2004 |
| EP | 1662886 A4 | 1/2007 |
| WO | 1997033822 A1 | 9/1997 |
| WO | 2001032029 A2 | 5/2001 |
| WO | 2001048907 A1 | 7/2001 |
| WO | 2004040989 A1 | 5/2004 |
| WO | 2005051090 A1 | 6/2005 |
| WO | 2011070083 A1 | 6/2011 |

OTHER PUBLICATIONS

Tootsie Roll, Tootsie Roll Factory, Aug. 14, 2012, YouTube. https://www.youtube.com/watch?v=HQgELKjdyE8.

Zhang Chill, Cereal Bar Cutting Machine, Sep. 28, 2013, YouTube. https://www.youtube.com/watch?v=L8Wf0qYf9Qw.

Jinansaixin, Health Cereal Bar Machinery, Cereal Bar Machine, Cereal Bar Making Machine, Mar. 23, 2013, YouTube. https://www.youtube.com/watch?v=PSn2-rwVZco.

Spanglercandy.com, Spangler Candy Cane Tour. http://www.spanglercandy.com/our-brands/candy-canes/tour.

Latiniusa, Continuous Sheeting & Slitting Line LHD-12/22/33, Forming Equipment, http://www.latiniusa.com/forming_machines.html#continuous_sheeting.

Made How, How Products are Made, Cereal, vol. 3. http://www.madehow.com/Volume-3/Cereal.html.

Dunbar Systems Inc., Mixers. http://www.dunbarsystems.com/bakery-equipment/mixers/default.html.

Seefer Makina, Cereal Bar Cutting Machine—Peanut Bar Cutting Machine—Chikki Bar Machine, Mar. 16, 2014, Youtube. https://www.youtube.com/watch?v=QxgwOgcqvCc.

Emma Christensen, How to Make Granola Bars at Home, The Kitchn, Sep. 11, 2012. http://www.thekitchn.com/how-to-make-homemade-granola-bars-cooking-lessons-from-the-kitchn-176676.

Wikihow, How to Make Granola Bars. http://www.wikihow.com/Make-Granola-Bars.

* cited by examiner

FOOD FORMING AND SHAPING DEVICE

FIELD OF USE

The present disclosure relates generally to food manufacturing equipment, and more particularly to food forming and shaping devices utilizing several rollers for creating and forming cylindrical food bars.

BACKGROUND

Various types of equipment are used to create food bars, such as cereal bars and snack bars. These cereal bars are generally held together by a binder such as corn syrup and other similar type of syrup ingredients (e.g., sugar, fibers). The binder may be heated and then added into the dry cereal mixture to assist in the blending process. The combined cereal is then formed into a wide slab by a forming and shaping device, which presses the combined cereal mixture through one or two rollers.

When the combined, cereal mixture is inserted through the rollers, the rollers may create the necessary pressure and cohesion to hopefully keep the combined cereal mixture together within the slab. These rollers are generally affixed at a certain location of the forming and shaping device and generally consist of one to two rollers. Additionally, these rollers are generally positioned above a conveyor belt, such that the rollers press the cereal base mixture against the conveyor belt when the combined cereal mixture enters the rollers. As a result, conventional bar shaping machines create wide slabs of fixed sizes and shapes (e.g., squares, rectangles) and sometimes do not provide the necessary cohesion to deliver a slab with increased density.

One common example is the Werner-Lehara bar extruder, which generally comprises one to two rollers and a conveyor belt. These rollers are generally positioned stationary above the conveyor belt, such that the combined cereal mixture is pressed against the conveyor belt. Once the combined cereal mixture enters the rollers, the combined cereal mixture is pressed against the conveyor belt and is extruded into an elongated and wide slab. Given that the rollers are fixed above the conveyor belt, the size, shape, and density of the combined cereal mixture are generally fixed. Thus, the Werner-Lehara bar extruder does not always provide the necessary cohesion to deliver a slab with sufficient density.

Other machines, however, exist that have movable rollers. But, the ability to move these rollers of these machines are for the sole purpose of cleaning and sanitation rather than varying the pressure or formation of the cereal bar. For example, U.S. Pat. No. 6,139,178, issued to Simon A. Whysall, discloses one or more movably mounted rollers. A pair of the rollers are positioned and affixed at a movable support mount, wherein the support mount is configured to shift along a pivot. When the rollers need to be cleaned, the support mount and rollers are pivoted to provide better access to the rollers for cleaning. Thus, the movability of these rollers do not provide a mechanism to obtain an increased/decreased density of the food bars.

Therefore, there remains a long felt need in the art for a food forming and shaping device that forms food bar slabs of varying densities and shapes. Preferably, the improved forming and shaping device will provide adjustability for the necessary bar cohesion for a variety of types of ingredients to be mixed and formed into a food bar.

BRIEF SUMMARY OF EMBODIMENTS

To minimize the limitations in the cited references, and to minimize other limitations that will become apparent upon reading and understanding the present specification, the following discloses a new and improved food forming and shaping device, which comprises rollers configured for creating food bars of varying sizes, shapes, and density.

One embodiment may be a food forming and shaping device for forming cereal bars, comprising: a forming and shaping portion; wherein the forming and shaping portion comprises: a frame, a first roller, a second roller, and one or more motors; wherein the first roller and the second rollers each comprise a food mixture engagement surface; wherein the one or more motors are configured to rotate the first roller and the second roller, such that the food mixture engagement surfaces rotate; wherein the frame comprises at least one opening; wherein the first roller and the second roller are directly or indirectly connected to the frame, such that the food mixture engagement surfaces are rotatable with respect to the frame; wherein the first roller and the second roller are substantially beneath the at least one opening; wherein the first roller is in close proximity to the second roller and is substantially parallel to the second roller, such that when a food mixture is inserted into the at least one opening the food mixture is cradled by the first and second rollers; and wherein the first roller and the second roller roll a plurality of times to press and shape the food mixture to create a formed and shaped food mixture. The forming and shaping device may further comprise: a first piston and a first arm; wherein a first end of the first arm may be connected to the frame at a first arm fulcrum point; wherein a body of the first piston may be connected to the frame; wherein a head of the first piston may be connected to the first arm; wherein a second end of the first arm may be connected to the first roller, such that the food mixture engagement surfaces may be rotatable with respect to the first arm; and wherein the first piston may be configured to move the first arm, such that the first roller may be shifted towards or away from the second roller. The one or more motors may be configured to rotate the first roller and the second roller in the same direction. The forming and shaping device may further comprise a third roller; wherein the third roller may comprise a food mixture engagement surface; wherein the one or more motors may be configured to rotate the third roller, such that the food mixture engagement surface of the third roller rotates; wherein the third roller may be directly or indirectly connected to the frame, such that the food mixture engagement surface of the third roller may be rotatable with respect to the frame; and wherein the third roller may be substantially parallel to the first roller and the second roller, such that when the food mixture may be cradled by the first roller and the second roller, the food mixture engagement surface of the third roller contacts the food mixture, such that the food mixture may be substantially constrained by the first roller, the second roller, and the third rollers. The third roller may be substantially above and substantially in-between the first roller and the second roller. The forming and shaping device may further comprise a second arm and a second piston; wherein the second arm may be connected to the frame; wherein a body of the second piston may be connected to the frame; wherein a head of the second piston may be connected to a first end of the second arm; wherein a second end of the first arm may be connected to the third roller, such that the food mixture engagement surface of the third roller may be rotatable with respect to the second arm; and wherein the second piston may be configured to move the second arm, such that the third roller is shifted towards or away from the first roller and the second roller. The first roller, the second roller, and the third roller may be configured to rotate in the same direction. The forming and shaping device may further comprise a third piston, a shoulder plate, and a top mixing surface; wherein a body of the third piston may be connected to the frame; wherein a head of the third piston may be connected to the shoulder plate; and wherein the third piston may be configured to move the shoulder plate along the top mixing surface, such that the shoulder plate pushes the food mixture into the at least one opening. The forming and shaping portion may be interconnected with a mixer; wherein the mixer may comprise: at least one binder container, at least one cereal base container, and at least one hopper; wherein the at least one binder container may be positioned substantially above the at least one hopper and may be configured to store and dispense a binder to the at least one hopper; wherein the at least one cereal base container may be positioned substantially above the at least one hopper and may be configured to store and dispense a cereal base to the at least one hopper; and wherein the at least one hopper may be configured to mix the cereal base and the binder to create the food mixture. The forming and shaping portion may be interconnected with a cutter; wherein the cutter may comprise one or more cutting instruments; and wherein the one or more cutting instruments may be configured to slice the formed and shaped food mixture to create one or more food bar portions. The food forming and shaping device may further comprise one or more conveyor belts; wherein the one or more conveyor belts may be positioned below the first roller and the second roller, and may be configured to transfer the formed and shaped food mixture away from the forming and shaping portion.

Another embodiment may be a food forming and shaping device for forming cereal bars, comprising: a forming and shaping portion; wherein the forming and shaping portion comprises: a frame, a first roller, a second roller, a third roller, and one or more motors; wherein the first roller, the second roller, and the third roller each comprise a food mixture engagement surface; wherein the one or more motors are configured to rotate the first roller, the second roller, and the third roller, such that the food mixture engagement surfaces rotate; wherein the frame comprises at least one opening; wherein the first roller, the second roller, and the third roller are directly or indirectly connected to the frame, such that the food mixture engagement surfaces are rotatable with respect to the frame; wherein the first roller and the second roller are substantially beneath the at least one opening; wherein the first roller is in close proximity to the second roller and is substantially parallel to the second roller, such that when a food mixture is inserted into the at least one opening the food mixture is cradled by the first and second rollers; wherein the third roller is substantially parallel to the first roller and the second roller, such that when the food mixture is cradled by the first and second rollers, the food mixture engagement surface of the third roller contacts the food mixture, such that the food mixture is substantially constrained by the first roller, the second roller, and the third roller; wherein the third roller is substantially above and substantially in-between the first roller and the second roller; wherein the first roller, the second roller, and the third roller roll a plurality of times to press and shape the food mixture to create a formed and shaped food mixture; and wherein the third roller is movable, such that when the third roller is moved closer towards the first and second rollers, a pressure on the food mixture is increased, such that a density of the formed and shaped food mixture is increased. The forming and shaping portion of the frame may further comprise: a first piston, a second piston, a first arm, and a second arm; wherein a first end of the first arm may be connected to the frame at a first arm fulcrum point; wherein a body of the first piston may be connected to the frame; wherein a head of the first piston may be connected to the first arm; wherein a second end of the first arm may be connected to the first roller, such that the food mixture engagement surfaces may be rotatable with respect to the first arm; wherein the first piston may be configured to move the first arm, such that the first roller may be shifted towards or away from the second roller; wherein the second arm may be connected to the frame; wherein a body of the second piston may be connected to the frame; wherein a head of the second piston may be connected to a first end of the second arm; wherein a second end of the first arm may be connected to the third roller, such that the food mixture engagement surface of the third roller may be rotatable with respect to the second arm; wherein the second piston may be configured to move the second arm, such that the third roller may be shifted towards or away from the first roller and the second roller; and wherein the third roller may increase a density of the formed and shaped food mixture when the third roller rolls and presses the formed and shaped food mixture against the first roller and the second roller. The one or more motors may be configured to rotate the first roller, the second roller, and the third roller in the same direction. The formed and shaped food mixture may be released from the forming and shaping device when the first roller is shifted away from the second roller. The first roller, the second roller, and the third roller may be configured to rotate in the same direction. The forming and shaping portion may further comprise a third piston, a shoulder plate, and a top mixing surface; wherein a body of the third piston may be connected to the frame; wherein a head of the third piston may be connected to the shoulder plate; and wherein the third piston may be configured to move the shoulder plate along the top mixing surface, such that the shoulder plate pushes the food mixture into the at least one opening. The forming and shaping portion may comprise at least one conveyor belt; wherein the at least one conveyor belt may comprise one or more conveyor belt dividers; wherein the one or more conveyor belt dividers may be configured to receive the formed and shaped food mixture when the formed and shaped food mixture is released from the first roller, the second roller, and the third roller; and wherein the at least one conveyor belt may be positioned below the first roller, the second roller, and the third roller and may be configured to transfer the formed and shaped food mixture away from the forming and shaping portion. The forming and shaping portion may be interconnected with a mixer; wherein the mixer may comprise: at least one binder container, at least one cereal base container, and at least one hopper; wherein the at least one binder container may be positioned substantially above the at least one hopper and may be configured to store and dispense a binder to the at least one hopper; wherein the at least one cereal base container may be positioned substantially above the at least one hopper and may be configured to store and dispense a cereal base to the at least one hopper; and wherein the at least one hopper may be configured to mix the cereal base and the binder to create the food mixture. The forming and shaping portion may be interconnected with a cutter; wherein the cutter may comprise one or more cutting instruments; and wherein the one or more cutting instruments may be configured to slice the formed and shaped food mixture to create one or more food bar portions.

Another embodiment may be a food forming and shaping device for forming cereal bars, comprising: an forming and shaping portion; wherein the forming and shaping portion comprises: a frame, one or more rollers, one or more motors, and one or more belts; wherein the one or more rollers comprise: a first roller and a second roller; wherein the frame comprises a mixing surface with at least one opening; wherein the first roller and the second roller are rotatably connected to the frame and beneath the at least one opening; wherein the first roller is adjacent to the second roller and is substantially parallel to the second roller; wherein the one or more belts comprise: a first belt and a second belt; wherein a first end of the first belt is connected to the one or more motors and a second end of the first belt is connected to the first roller, such that the one or more motors are configured to actuate the first roller; wherein a first end of the second belt is connected to the one or more motors and a second end of the second belt is connected to the second roller, such that the one or more motors are configured to actuate the second roller; and wherein, when a food mixture is inserted into the at least one opening of mixing surface of the frame, the first roller and the second roller roll and press the food mixture to create a formed and shaped food mixture. The forming and shaping portion of the frame may comprise: a first piston and a first arm; wherein a first end of the first arm may be pivotally connected to a lower portion of the frame; wherein a body of the first piston may be connected to the frame and may be oriented horizontally along a longitudinal axis of the frame; wherein a head of the first piston may be connected to a center portion of the first arm; wherein a second end of the first arm may be rotatably connected to the first roller; and wherein the first piston may be configured to shift the first arm and the first roller horizontally, such that the first roller may shift towards or away from the second roller. The one or more motors may be configured to actuate the first roller and the second roller in the same direction. The one or more rollers may further comprise a third roller; wherein the third roller may be rotatably connected within the frame; and wherein the third roller may be above and in-between the first roller and the second roller. The one or more belts may comprise: a third belt; and wherein a first end of the third belt may be connected to the one or more motors and a second end of the third belt may be connected to the third roller, such that the one or more motors may be configured to actuate the third roller. The forming and shaping portion of the frame may further comprise: a second arm and a second piston; wherein a center portion of the second arm may be pivotally connected to the frame; wherein a body of the second piston may be connected to the frame and oriented vertically along a latitudinal axis of the frame; wherein a head of the second piston may be connected to a first end of the second arm; wherein a second end of the first arm may be rotatably connected to the third roller; and wherein the second piston may be configured to shift the second arm and the third roller vertically, such that the third roller may shift towards or away from the first roller and the second roller. The third roller may be configured to rotate in the same direction as the first roller and the second roller. The food forming and shaping device may further comprise: a mixer; wherein the mixer may comprise: at least one binder container, at least one cereal base container, and at least one hopper; wherein the at least one binder container may be positioned substantially above the at least one hopper and may be configured to store and dispense a binder to the at least one hopper; wherein the at least one cereal base container may be positioned substantially above the at least one hopper and may be configured to store and dispense a cereal base to the at least one hopper; wherein the at least one hopper may be positioned above the mixing surface and may be configured to mix the cereal base and the binder to create the food mixture; and wherein the at least one hopper may be configured to tilt, such that the food mixture may be poured onto the mixing surface of the frame. The forming and shaping portion of the frame may further comprise a third piston and a shoulder plate; wherein a body of the third piston may be connected to the frame and may be oriented horizontally along a longitudinal axis of the frame; wherein a head of the third piston may be connected to the shoulder plate; and wherein the third piston may be configured to move the shoulder plate horizontally along the mixing surface, such that the shoulder plate may push the food mixture into the at least one opening of the mixing surface and towards the first roller and the second roller. The food forming and shaping device may further comprise a cutter; wherein the cutter of the food forming and shaping device may further comprise one or more cutting instruments; and wherein the one or more cutting instruments may be configured to slice the formed and shaped food mixture to create one or more food bar portions. The food forming and shaping device may further comprise one or more conveyor belts; wherein the one or more conveyor belts may be positioned below the first roller and the second roller and may be configured to transfer the formed and shaped food mixture away from the forming and shaping device of the food forming and shaping device.

It is an object to provide a food forming and shaping device with movable rollers to create formed and shaped food mixtures of varying, shapes, thicknesses, and densities.

It is an object to provide a food forming and shaping device that may be interconnected with a mixer and/or a cutter, wherein the mixer mixes a cereal base (typically a dry cereal mixture) and a binder to create a combined cereal mixture; wherein the forming and shaping device rolls and presses the food mixture to form into a desired shape and density; and wherein the cutter slices the formed and shaped food mixture into one or more food bar portions.

It is an object to overcome the limitations of the prior art.

Other features and advantages are inherent in the food forming and shaping device claimed and disclosed will become apparent to those skilled in the art from the following detailed description and its accompanying drawings.

BRIEF DESCRIPTION OF THE DRAWINGS

The figures are illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated.

DETAILED DESCRIPTION OF ILLUSTRATIVE EMBODIMENTS

Figure 1:
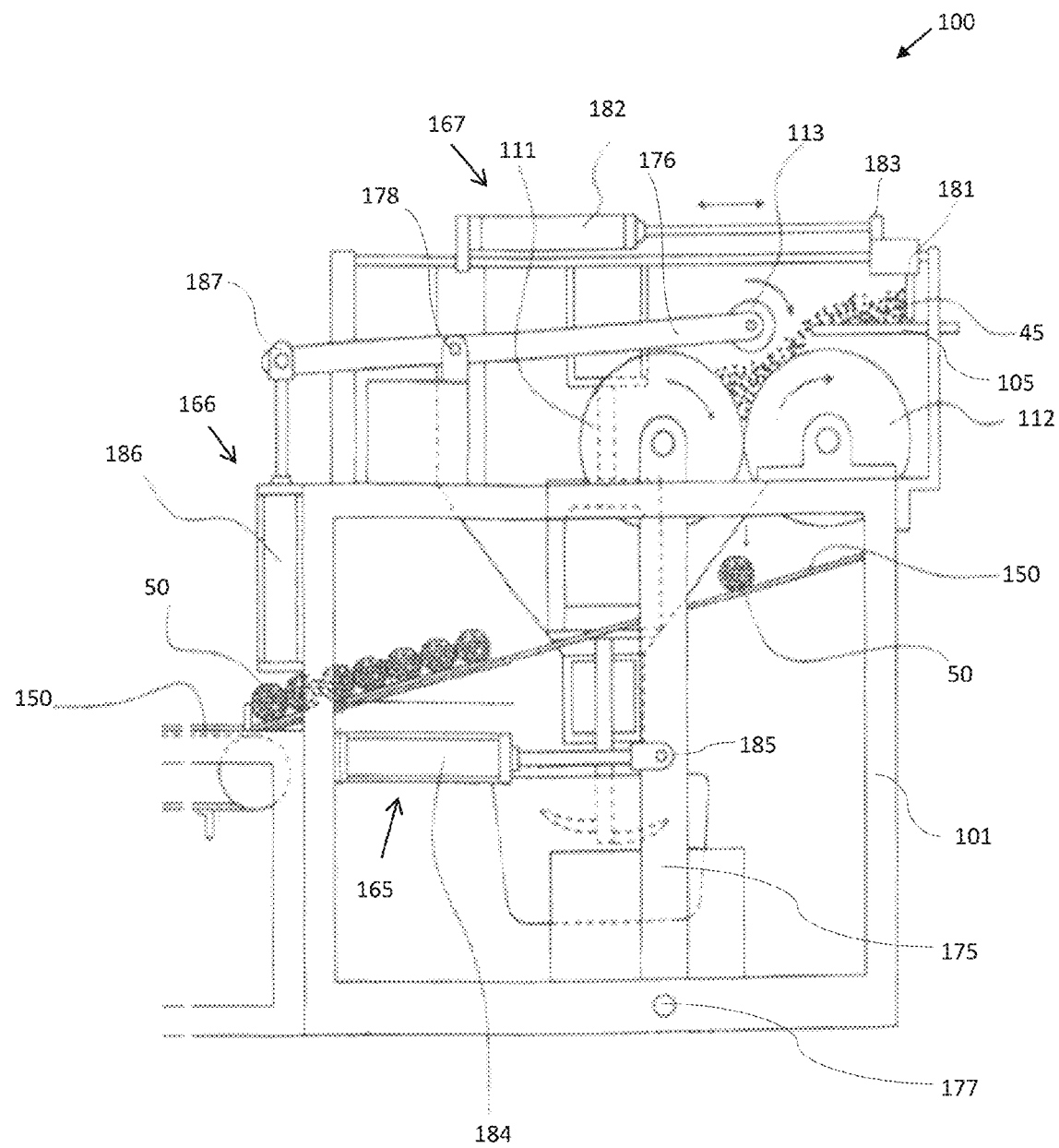
FIG. 1 is an illustration of one embodiment of the forming and shaping portion of the food forming and shaping device.

In the following detailed description of various embodiments, numerous specific details are set forth in order to provide a thorough understanding of various aspects of one or more embodiments. However, the one or more embodiments may be practiced without some or all of these specific details. In other instances, well-known methods, procedures, and/or components have not been described in detail so as not to unnecessarily obscure aspects of embodiments.

While multiple embodiments are disclosed, still other embodiments of the present disclosure will become apparent to those skilled in the art from the following detailed description, which shows and describes illustrative embodiments. As will be realized, the embodiments are capable of modifications in various obvious aspects, all without departing from the spirit and scope of the present disclosure. Accordingly, the graphs, figures, and the detailed descriptions thereof, are to be regarded as illustrative in nature and not restrictive. Also, the reference or non-reference to a particular embodiment shall not be interpreted to limit the scope.

Before the embodiments are disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In the following description, certain terminology is used to describe certain features of one or more embodiments. For example, a surface that is "substantially" flat would mean that the object is either completely flat or nearly completely flat. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the terms "cereal base" and "cereal base ingredients" generally refer to any dry cereal mix, cereal grain, nuts, dried fruit, confections (e.g., chocolate chips), nuts, legumes, or grasses used for creating cereal bars or snack bars, including without limitation, puffed grains, rolled cereal, and/or cereal flakes. Puffed grains may refer to whole grains of wheat or rice created in high temperature, pressure, or extrusion. Rolled cereals may be grains infused with a binder comprising sugar, malt, salt or vitamins. Cereal may refer to a grass cultivated for the edible components of its grain and is generally composed of the endosperm, germ, and bran.

As used herein, the term "formed and shaped" generally refers to the act of forcing, pressing, compacting, rolling, forming, and shaping of a food mixture, preferably by rollers, to produce a formed and shaped food mixture.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Figure 4:
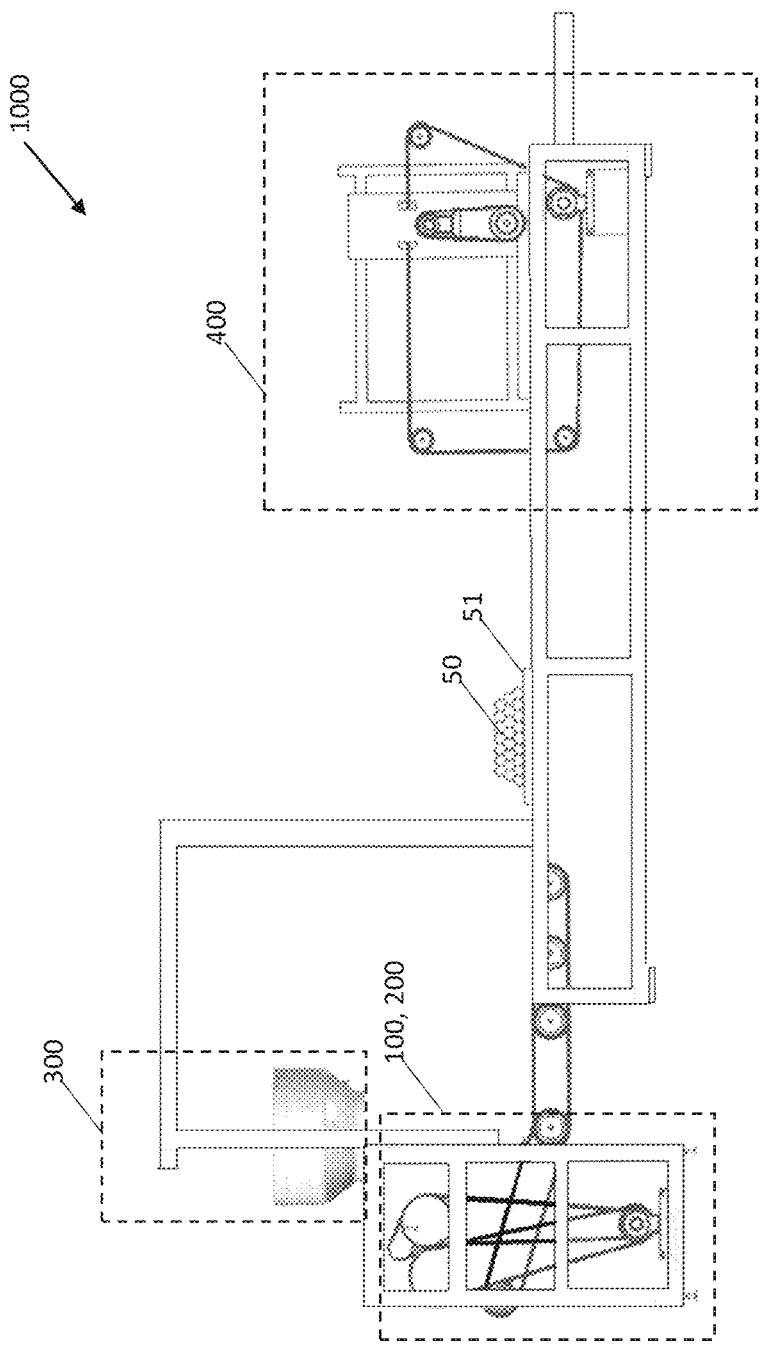
FIG. 4 is an illustration of one embodiment of the food forming and shaping device as shown in association with a mixer and a cutter.

FIG. 1 is an illustration of one embodiment of the forming and shaping portion of the food forming and shaping device. As shown in FIG. 1, one embodiment of the forming and shaping portion 100 of the food forming and shaping device 1000 (as shown in FIG. 4) may comprise: a frame 101, top mixing surface 105, first roller 111, second roller 112, third roller 113, conveyor belt 150, first piston 165, second piston 166, third piston 167, first arm 175, second arm 176, and shoulder plate 181. FIG. 1 shows that a food mixture 45 may be poured or placed onto the top mixing surface 105. The top mixing surface 105 may be any surface used to hold and/or mix food. The food mixture 45 is preferably any mixture of cereal base ingredients (e.g., rolled cereals, puffed grains, and cereal flakes) and binder (e.g., syrup) used to make cereal snack bars. Once on the top mixing surface 105, the food mixture 45 may be transferred or poured towards the rollers via the shoulder plate 181. Specifically, a piston (i.e., third piston 167) may move the shoulder plate 181 horizontally and across the mixing surface 105, such that the food mixture 45 lands onto the first roller 111 and second roller 112. The body 182 of the third piston 167 may be connected to the frame 101 and may shift the head 183, so that the shoulder plate 181 may move across the top mixing surface 105. The first roller 111 and second roller 112 are preferably in parallel relations and in close proximity to one another, so that the food mixture 45 may land on the first roller 111 and second roller 112 and not pass through the rollers and onto the conveyor belt 150. In one embodiment, the first roller 111 and second roller 112 may not touch one another during rolling, while, in another embodiment, the first roller 111 and second roller 112 may contact or touch each other during operation.

Additionally, a third roller 113 may be positioned substantially above and substantially in-between the first roller 111 and second roller 112. The third roller 113 may also move towards the food mixture 45 within the frame 101 and press against the food mixture 45 and against the first roller 111 and/or the second roller 112, so as to substantially constrain the food mixture 45 within the rollers. Preferably, a lip or sidewall 500 (shown in FIG. 5) is positioned at the side of frame 101 and/or rollers 111, 112, 113, so as to contain the food mixture 45 between the rollers and prevent the food mixture 45 from squeezing out of the sides of the rollers during the forming, shaping, or compacting process. Once the food mixture 45 is in-between the first roller 111, second roller 112, and third roller 113, the rollers may rotate, so as to press, compact, roll, shape, and form the food mixture into a formed and shaped food mixture 50, which is preferably a cylindrical roll or rope-shaped. In one embodiment, the first roller 111, second roller 112, and third roller 113 may rotate in the same direction (e.g., all clockwise or all counter-clockwise). In other embodiments, the rollers 111, 112, 113 may rotate in different directions. Importantly, the first roller 111 and third roller 113 may shift their positions while rotating. This may act to increase or decrease the density of the formed and shaped food mixture 50. For example, the first piston 165 may pivot, push, pull, or otherwise move the first arm 175 via a fulcrum 177, such that the first roller 111 may move towards or away the second roller 112. The body 184 of the first piston 165, which may be connected to the frame 101, may shift the head 185, which in turn may move the first roller 111 towards the second roller 112. Similarly, the second piston 166 may pivot, push, pull, or otherwise move the second arm 176 via a fulcrum 178, such that the third roller 113 may move towards or away the first roller 111 and/or second roller 112. The body 186 of the second piston 166, which may be connected to the frame 101, may move the head 187, which in turn may move the third roller 113 to towards the first roller 111 and/or second roller 112. Thus, in various embodiments, the positions of the first roller 111, second roller 112, and third roller 113 may be adjusted or moved, automatically or manually, in various directions, such that they may be shifted towards or away from one another. Specifically, as shown in FIG. 1, the first roller 111 may shift towards and away from the second roller 112 via piston 165. This preferably allows the rollers to increase or decrease compacting pressure on the food mixture 45, which in turn allows the density of the formed and shaped food mixture 50 to be increased, decreased, and/or set to a desired density. This movement may also allow the formed and shaped food mixture 50 to be removed, moved, and/or dropped onto the conveyor belt 150 after the formed and shaped food mixture 50 is rolled and formed to the desired density and shape. Although FIG. 1 shows three rollers, any number of rollers may be used such as four, five, or six. Additionally, although first and third rollers 111, 113 are shown as movable and second roller 112 is show as not movable, it should be understood that any of the rollers may be movable or non-movable.

After the food mixture 45 is pressed and rolled into the formed and shaped food mixture 50, the formed and shaped food mixture 50 may be released from the rollers and dropped onto the conveyor belt 150, which preferably transfers the formed and shaped food mixture 50 to the cutter 400 (shown in FIG. 4) of the food forming and shaping device 1000. As shown in FIG. 1, the formed and shaped food mixture 50 is preferably removed, moved, or dropped, by moving or pivoting first roller 111 away from second roller 112.

Figure 2:
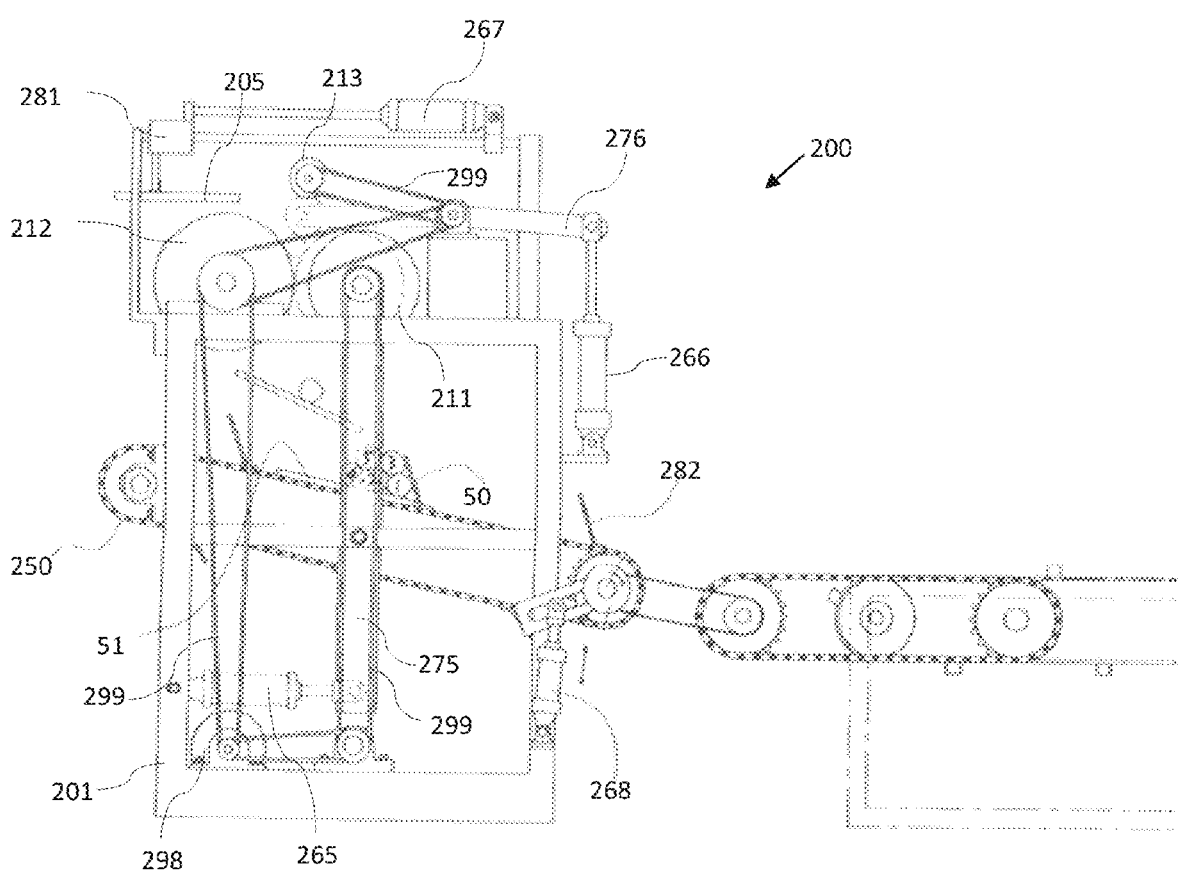
FIG. 2 is an illustration of another embodiment of the forming and shaping portion and shows the forming and shaping portion with belts and conveyor belt dividers.

FIG. 2 is an illustration of another embodiment of the forming and shaping device and shows the forming and shaping portion with belts and conveyor belt dividers. As shown in FIG. 2, another embodiment of the forming and shaping portion 200 of the food forming and shaping device 1000 may comprise: a frame 201, top mixing surface 205, first roller 211, second roller 212, third roller 213, conveyor belt 250, first piston 265, second piston 266, third piston 267, fourth piston 268, first arm 275, second arm 276, shoulder plate 281, conveyor belt dividers 282, motor 298, and belts 299. As discussed above, the food mixture 45 may be poured onto the top mixing surface 205 from the hopper 340 (shown in FIG. 3). Once the food mixture 45 is on the top mixing surface 205, the food mixture 45, or a portion thereof, may be transferred to the rollers 211, 212, 213 via the shoulder plate 281 and third piston 267. When the food mixture 45 is poured and trapped in-between the first roller 211, second roller 212, and third roller 213, the rollers may rotate, so as to press, compact, roll, shape, and form the food mixture into a formed and shaped food mixture 50. Preferably, the rotational movement of the rollers 211, 212, 213 may be actuated by a motor 298 and belts 299. Preferably the rotational movement of the rollers may all be in a single direction, which may allow a food mixture 45 to roll and form into a formed and shaped food mixture 50 that, as shown, may have a substantially cylindrical shape. Furthermore, any standard motors and belts known in the art may be used to actuate the rotation of the rollers 211, 212, 213.

Additionally, the sidewalls 500 or lips may be located at the side of frame 201 and/or rollers 211, 212, 213, so as to substantially contain the food mixture 45 in-between the rollers. The sidewalls 500 also preferably prevent the food mixture 45 from extruding out of the sides of the rollers during the forming, shaping, and compacting process, and to prevent the food mixture 45 from contacting the belts 299. The formed and shaped food mixture 50 may then be removed to or dropped onto tray 51 on the conveyor belt 250 by simply moving or pivoting first roller 211 away from second roller 212.

In this embodiment, as shown in FIG. 2, the conveyor belt 250 may also comprise one or more conveyor belt dividers 282. The conveyor belt divider 282 may assist in holding and dividing the formed and shaped food mixture 50 and/or tray 51 when the conveyor belt 250 is tilted at an angle. The angle of the conveyor belt 250 may be adjusted by the fourth piston 268, so as to vary the angle of the conveyor belt 250 when transferring the formed and shaped food mixture 50 away from the forming and shaping portion 200.

Figure 3:
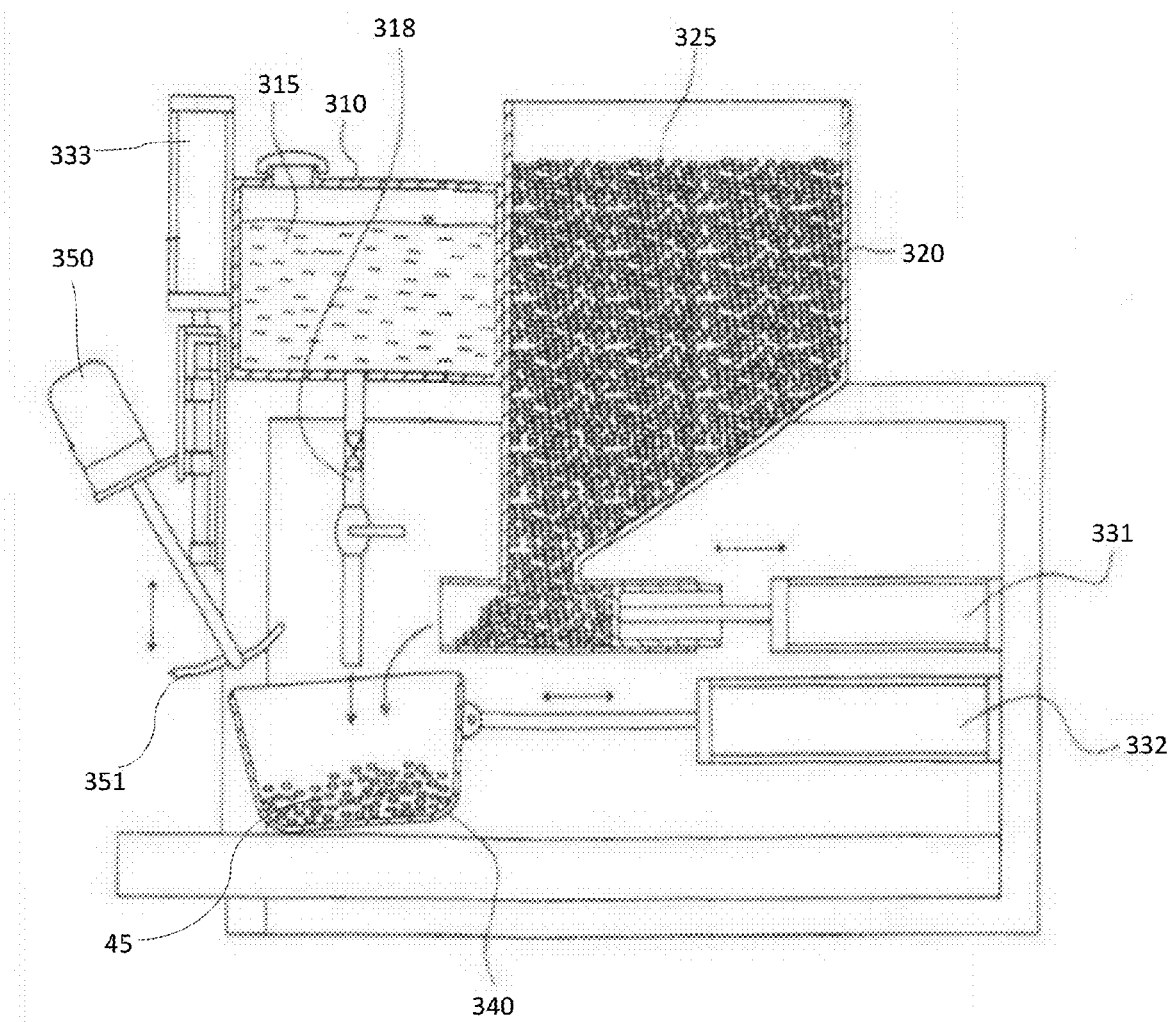
FIG. 3 is an illustration of one embodiment of the mixer.

FIG. 3 is an illustration of one embodiment of the mixer. As shown in FIG. 3, one embodiment of the mixer 300 of the food forming and shaping device 1000 may comprise: a binder container 310, a cereal base container 320, pistons 331, 332, 333, hopper 340, mixing device 350, and mixing blade 351. The mixer 300 is preferably located above the forming and shaping device of the food forming and shaping device 1000. FIG. 3 shows that the binder container 310 is generally used to store and dispense binder 315 such as syrup into the hopper 340 through a valve 318. Similarly, the cereal base container 320 may be used to store and dispense cereal base ingredients 325 (e.g., grain, rolled cereals, puffed grains, and cereal flakes) via a piston 331. Once both the cereal base 325 and binder 315 are in the hopper 340, both the syrup and food grain may be mixed and blended to form a food mixture 45. Specifically, piston 332 may tip and move the hopper 340, such that the hopper 340 and food mixture 45 are substantially beneath the mixing device 350. Piston 333 may then move the mixing blade 351 and mixing device 350 into the hopper 340, so that the mixing device 350 may blend and mix the food mixture 45. The food mixture 45 may then be transferred or poured onto the top mixing surface 105, 205 of the forming and shaping portion 100, 200. For example, in one embodiment, the piston 332 may tip the hopper 340, so that the hopper 340 may tilt pour the food mixture 45 onto the top mixing surface 105, 205.

FIG. 4 is an illustration of one embodiment of the food forming and shaping device as shown with a mixer and a cutter. As shown in FIG. 4, one embodiment of a food forming and shaping device 1000 may be interconnected with a mixer 300 and a cutter 400. As discussed above, the mixer 300 may comprise a cereal base container 320, a binder container 310, and a hopper 340. The cereal base container 320 is generally used to store and dispense cereal base ingredients 325, such as rolled cereals, puffed grains, and cereal flakes, into the hopper 340. Similarly, the binder container 310 is generally used to store and dispense the binder 315, such as syrup, into the hopper 340. Once cereal base ingredients 325 and binder 315 are poured into the hopper 340, both the binder 315 and cereal base ingredients 325 may be mixed to create a food mixture 45. The food mixture 45 may then be transferred to the forming and shaping portion 100, 200 of the food forming and shaping device 1000.

FIG. 4 also shows the forming and shaping portion 100, 200 of the food forming and shaping device 1000. Once the food mixture 45 is transferred to the forming and shaping portion 100, 200 of the food forming and shaping device 1000, the food mixture 45 may be poured onto the top mixing surface 105, 205. The food mixture 45 may be further mixed manually by hand on the top mixing surface 105, 205 for better cohesion, and may be transferred into an opening of the frame 101, 201 of the forming and shaping portion 100, 200 for rolling and pressing. This may be accomplished by a shoulder plate 181, 281, which may push the food mixture 45 into the opening via a piston (i.e., third piston 167, 267). Once the food mixture 45 enters the opening, the rollers 111, 112, 113, 211, 212, 213 may be used to roll and press the food mixture 45 into a formed and shaped food mixture 50. One or more of the rollers 111, 112, 113, 211, 212, 213 may have their position shifted to vary the density and thickness of the formed and shaped food mixture 50. The shifting of the rollers 111, 112, 113, 211, 212, 213 may also be used to release the formed and shaped food mixture 50 so that it may be moved or dropped onto a tray or conveyor belt 150, 250. The formed and shaped food mixture 50 may be taken and/or moved onto a tray 51 and/or be transferred to the cutter 400 of the food forming and shaping device 1000.

FIG. 4 also shows a cutter 400 of the food forming and shaping device 1000. Preferably, the cutter 400 of the food forming and shaping device 1000 may comprise one or more slicing instruments such as blades or guillotines. These blades and guillotines may be used to cut the formed and shaped food mixture 50 into one or more food bar portions. This may be accomplished by transferring the formed and shaped food mixture 50 along a conveyor belt 150, 250 and into the blades and/or guillotines.

Figure 5:
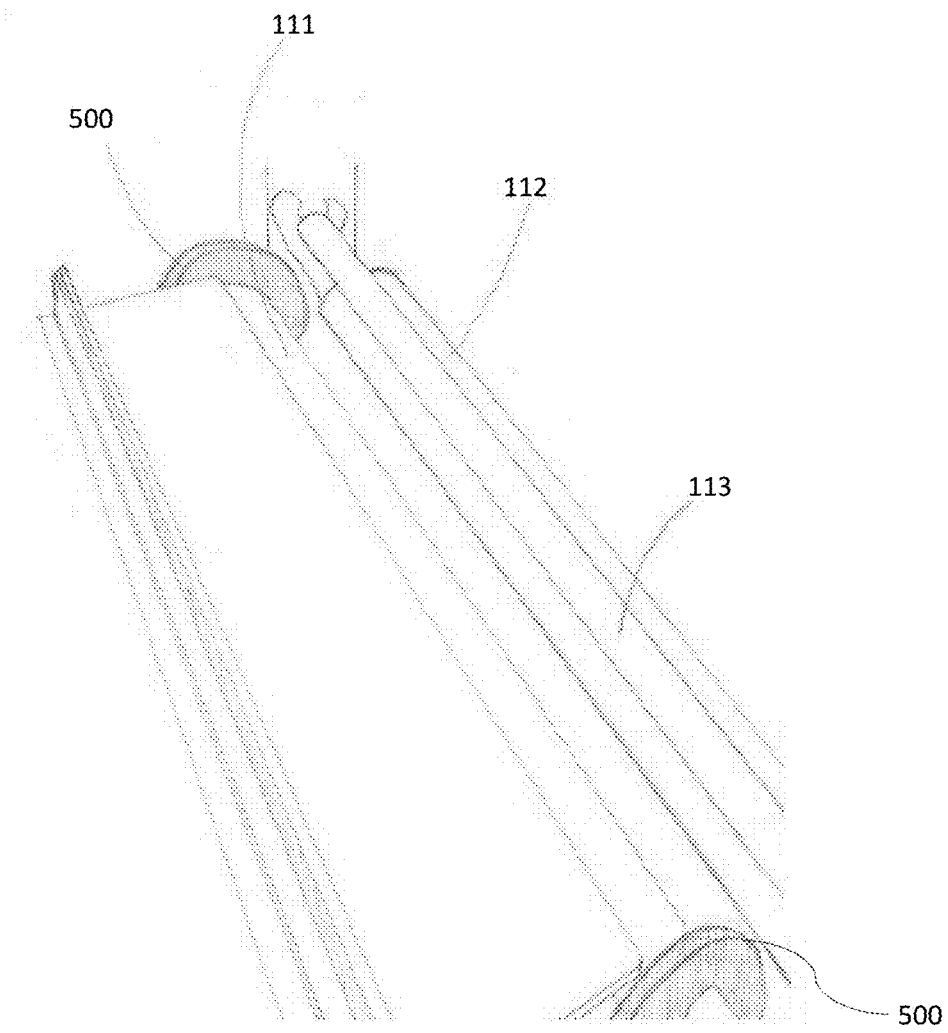
FIG. 5 is an illustration of a perspective view of another embodiment of the forming and shaping portion of the food forming and shaping device.

FIG. 5 is an illustration of a perspective view of another embodiment of the forming and shaping portion of the food forming and shaping device. As shown in FIG. 5, another embodiment of the forming and shaping portion may comprise: a first roller 111, second roller 112, third roller 113, and one or more sidewalls 500. FIG. 5 shows that the sidewalls 500 may be positioned at the end of the rollers 111, 112, 113, so as to contain the food mixture 45 between the rollers and prevent the food mixture 45 from squeezing out of the sides of the rollers during the forming, shaping, or compacting process. Once the food mixture 45 is in-between the first roller 111, second roller 112, and third roller 113, the rollers may rotate, so as to press, compact, roll, shape, and form the food mixture into a formed and shaped food mixture 50.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The present disclosure should therefore not be limited by the above described embodiment, method, and examples, but by all embodiments and methods within the scope and spirit of the embodiments as claimed.

The foregoing description of the embodiment of the invention has been presented for the purposes of illustration and description. While multiple embodiments are disclosed, still other embodiments of the present disclosure will become apparent to those skilled in the art from the above detailed description, which shows and describes illustrative embodiments. As will be realized, the embodiments are capable of modifications in various obvious aspects, all without departing from the spirit and scope of the present disclosure. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope. It is intended that the scope shall not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A food forming and shaping device for forming cereal bars, comprising:
    a forming and shaping portion;
    wherein said forming and shaping portion comprises: a frame, a first roller, a second roller, and one or more motors;
    wherein said first roller and said second rollers each comprise a food mixture engagement surface;
    wherein said one or more motors are configured to rotate said first roller and said second roller, such that said food mixture engagement surfaces rotate;
    wherein said frame comprises at least one opening;
    wherein said first roller and said second roller are directly or indirectly connected to said frame, such that said food mixture engagement surfaces are rotatable with respect to said frame;
    wherein said first roller and said second roller are substantially beneath said at least one opening;
    wherein said first roller is in close proximity to said second roller and is substantially parallel to said second roller, such that when a food mixture is inserted into said at least one opening said food mixture is cradled by said first and second rollers;
    wherein said first roller and said second roller roll a plurality of times to press and shape said food mixture to create a formed and shaped food mixture,
    wherein said forming and shaping device further comprises a third roller;
    wherein said third roller comprises a food mixture engagement surface;
    wherein said one or more motors are configured to rotate said third roller, such that said food mixture engagement surface of said third roller rotates;
    wherein said third roller is directly or indirectly connected to said frame, such that said food mixture engagement surface of said third roller is rotatable with respect to said frame; and
    wherein said third roller is substantially parallel to said first roller and said second roller, such that when said food mixture is cradled by said first roller and said second roller, said food mixture engagement surface of said third roller contacts said food mixture, such that said food mixture is substantially constrained by said first roller, said second roller, and said third rollers.

2. The food forming and shaping device according to claim 1, wherein said third roller is substantially above and substantially in-between said first roller and said second roller.

3. The food forming and shaping device according to claim 2, wherein said forming and shaping device further comprises a second arm and a second piston;
    wherein said second arm is connected to said frame;
    wherein a body of said second piston is connected to said frame;
    wherein a head of said second piston is connected to a first end of said second arm;
    wherein a second end of said first arm is connected to said third roller, such that said food mixture engagement surface of said third roller is rotateable with respect to said second arm; and wherein said second piston is configured to move said second arm, such that said third roller is shifted towards or away from said first roller and said second roller.

4. The food forming and shaping device according to claim 3, wherein said first roller, said second roller, and said third roller are configured to rotate in the same direction.

5. The food forming and shaping device according to claim 3, wherein said forming and shaping device further comprises a third piston, a shoulder plate, and a top mixing surface;
   wherein a body of said third piston is connected to said frame;
   wherein a head of said third piston is connected to said shoulder plate; and
   wherein said third piston is configured to move said shoulder plate along said top mixing surface, such that said shoulder plate pushes said food mixture into said at least one opening.

6. A food forming and shaping device for forming cereal bars, comprising:
   a forming and shaping portion;
   wherein said forming and shaping portion comprises: a frame, a first roller, a second roller, a third roller, and one or more motors;
   wherein said first roller, said second roller, and said third roller each comprise a food mixture engagement surface;
   wherein said one or more motors are configured to rotate said first roller, said second roller, and said third roller, such that said food mixture engagement surfaces rotate;
   wherein said frame comprises at least one opening;
   wherein said first roller, said second roller, and said third roller are directly or indirectly connected to said frame, such that said food mixture engagement surfaces are rotatable with respect to said frame;
   wherein said first roller and said second roller are substantially beneath said at least one opening;
   wherein said first roller is in close proximity to said second roller and is substantially parallel to said second roller, such that when a food mixture is inserted into said at least one opening said food mixture is cradled by said first and second rollers;
   wherein said third roller is substantially parallel to said first roller and said second roller, such that when said food mixture is cradled by said first and second rollers, said food mixture engagement surface of said third roller contacts said food mixture, such that said food mixture is substantially constrained by said first roller, said second roller, and said third roller;
   wherein said third roller is substantially above and substantially in-between said first roller and said second roller;
   wherein said first roller, said second roller, and said third roller roll a plurality of times to press and shape said food mixture to create a formed and shaped food mixture; and
   wherein said third roller is moveable, such that when said third roller is moved closer towards said first and second rollers, a pressure on said food mixture is increased, such that a density of said formed and shaped food mixture is increased.

7. The food forming and shaping device according to claim 6, wherein said forming and shaping portion of said frame further comprises: a first piston, a second piston, a first arm, and a second arm;
   wherein a first end of said first arm is connected to said frame at a first arm fulcrum point;
   wherein a body of said first piston is connected to said frame;
   wherein a head of said first piston is connected to said first arm;
   wherein a second end of said first arm is connected to said first roller, such that said food mixture engagement surfaces are rotatable with respect to said first arm;
   wherein said first piston is configured to move said first arm, such that said first roller is shifted towards or away from said second roller;
   wherein said second arm is connected to said frame;
   wherein a body of said second piston is connected to said frame;
   wherein a head of said second piston is connected to a first end of said second arm;
   wherein a second end of said first arm is connected to said third roller, such that said food mixture engagement surface of said third roller is rotateable with respect to said second arm;
   wherein said second piston is configured to move said second arm, such that said third roller is shifted towards or away from said first roller and said second roller; and
   wherein said third roller increases a density of said formed and shaped food mixture when said third roller rolls and presses said formed and shaped food mixture against said first roller and said second roller.

8. The food forming and shaping device according to claim 7, wherein said one or more motors are configured to rotate said first roller, said second roller, and said third roller in the same direction.

9. The food forming and shaping device according to claim 8, wherein said formed and shaped food mixture is released from said forming and shaping device when said first roller is shifted away from said second roller.

10. The food forming and shaping device according to claim 9, wherein said first roller, said second roller, and said third roller are configured to rotate in the same direction.

11. The food forming and shaping device according to claim 10, wherein said forming and shaping portion further comprises a third piston, a shoulder plate, and a top mixing surface;
    wherein a body of said third piston is connected to said frame;
    wherein a head of said third piston is connected to said shoulder plate; and
    wherein said third piston is configured to move said shoulder plate along said top mixing surface, such that said shoulder plate pushes said food mixture into said at least one opening.

12. The food forming and shaping device according to claim 11, wherein said forming and shaping portion comprises at least one conveyor belt;
    wherein said at least one conveyer belt comprises one or more conveyor belt dividers;
    wherein said one or more conveyer belt dividers are configured to receive said formed and shaped food mixture when said formed and shaped food mixture is released from said first roller, said second roller, and said third roller; and
    wherein said at least one conveyor belt is positioned below said first roller, said second roller, and said third roller and is configured to transfer said formed and shaped food mixture away from said forming and shaping portion.

13. The food forming and shaping device according to claim 12, wherein said forming and shaping portion is interconnected with a mixer;

wherein said mixer comprises: at least one binder container, at least one cereal base container, and at least one hopper;

wherein said at least one binder container is positioned substantially above said at least one hopper and is configured to store and dispense a binder to said at least one hopper;

wherein said at least one cereal base container is positioned substantially above said at least one hopper and is configured to store and dispense a cereal base to said at least one hopper; and wherein said at least one hopper is configured to mix said cereal base and said binder to create said food mixture.

14. The food forming and shaping device according to claim 13, wherein said forming and shaping portion is interconnected with a cutter;

wherein said cutter comprises one or more cutting instruments; and wherein said one or more cutting instruments are configured to slice said formed and shaped food mixture to create one or more food bar portions.

\* \* \* \* \*